United States Patent
Judge et al.

(10) Patent No.: US 10,644,994 B1
(45) Date of Patent: *May 5, 2020

(54) ENSURING SEPARATE NETWORK PATHS BETWEEN PAIRS OF SOURCE AND DESTINATION DEVICES

(71) Applicant: Amazon Technologies, Inc., Seattle, WA (US)

(72) Inventors: Alan Michael Judge, Dublin (IE); Jamie Plenderleith, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/872,865

(22) Filed: Jan. 16, 2018

(51) Int. Cl.
| | |
|---|---|
| *H04L 12/28* | (2006.01) |
| *H04L 12/721* | (2013.01) |
| *H04L 12/801* | (2013.01) |
| *H04L 12/751* | (2013.01) |
| *H04L 12/743* | (2013.01) |
| *H04L 29/06* | (2006.01) |
| *H04L 12/707* | (2013.01) |

(52) U.S. Cl.
CPC .............. *H04L 45/38* (2013.01); *H04L 45/02* (2013.01); *H04L 45/24* (2013.01); *H04L 45/7453* (2013.01); *H04L 47/10* (2013.01); *H04L 69/164* (2013.01); *H04L 2212/00* (2013.01)

(58) Field of Classification Search
CPC ....... H04L 45/38; H04L 45/02; H04L 69/164; H04L 45/7453
See application file for complete search history.

(56) References Cited

U.S. PATENT DOCUMENTS

| | | | | |
|---|---|---|---|---|
| 5,579,307 | A * | 11/1996 | Richetta | H04B 7/1856 370/409 |
| 6,847,647 | B1 * | 1/2005 | Wrenn | H04L 45/24 370/392 |
| 7,239,641 | B1 * | 7/2007 | Banks | H04L 45/54 370/395.1 |
| 7,468,978 | B2 * | 12/2008 | Callon | H04L 12/4633 370/392 |

(Continued)

OTHER PUBLICATIONS

Non-Final Office Action, U.S. Appl. No. 15/872,856, 14 pages, dated Jan. 28, 2019.

(Continued)

*Primary Examiner* — Phuc H Tran
(74) *Attorney, Agent, or Firm* — Klarquist Sparkman, LLP

(57) ABSTRACT

Technologies are provided for ensuring that separate network paths within a network are used for network traffic between multiple source devices and a destination device or between pairs of source and destination devices. In some solutions, network path information is determined and sent to source devices that use the network path information to encapsulate network packets that then use separate network paths for at least a portion of their paths through the network. In some solutions, separate network paths are ensured using network path separation lists that are sent to network devices to make network traffic routing decisions. In some solutions, flow description information is calculated and sent to network devices to make network traffic routing decisions to keep network flows separate.

13 Claims, 9 Drawing Sheets

(56) References Cited

U.S. PATENT DOCUMENTS

| | | | |
|---|---|---|---|
| 7,720,076 B2* | 5/2010 | Dobbins | H04L 12/1886 370/395.52 |
| 8,787,400 B1 | 7/2014 | Barth et al. | |
| 9,172,645 B1 | 10/2015 | Aybay | |
| 2003/0043802 A1 | 3/2003 | Yazaki et al. | |
| 2012/0099591 A1* | 4/2012 | Kotha | H04L 45/54 370/392 |
| 2012/0307680 A1* | 12/2012 | Kim | H04L 61/2528 370/254 |
| 2015/0319213 A1* | 11/2015 | Lida | H04L 12/6418 709/219 |
| 2018/0139680 A1* | 5/2018 | Hui | H04W 40/16 |

OTHER PUBLICATIONS

Non-Final Office Action, U.S. Appl. No. 15/872,856, 8 pages, dated Jul. 10, 2019.

* cited by examiner

ENSURING SEPARATE NETWORK PATHS BETWEEN PAIRS OF SOURCE AND DESTINATION DEVICES

BACKGROUND

Computer networks are widely used to exchange information among computing devices. If there are problems along a path within the network (e.g., network problems, routing problems, congestion, etc.), then users of the network may experience problems accessing services provided by the network (e.g., service interruptions or slowdowns).

In a packet-switched network that connects many computing devices, there are typically multiple potential paths through the network from a given sending device to a given receiving device. The intermediate network devices make routing decisions to decide which path a network packet traveling from a sending device to a destination device will take. Many strategies exist for choosing a path, such as choosing the path with the lowest cost, least number of hops, lowest latency, best quality of service, etc. While choosing an appropriate path between a source and a destination can result in efficient delivery of network packets, situations can arise that disrupt network traffic along a particular path, such as congestion, failure of a network connection, etc. While a path can be changed once a failure is detected, network traffic may be interrupted or delayed during the time it takes to identify the failure and select an alternate path to avoid the failure. In such situations, there can be a number of sending devices that cannot communicate with the destination device due to the failure along the particular path.

DETAILED DESCRIPTION

Figure 1:
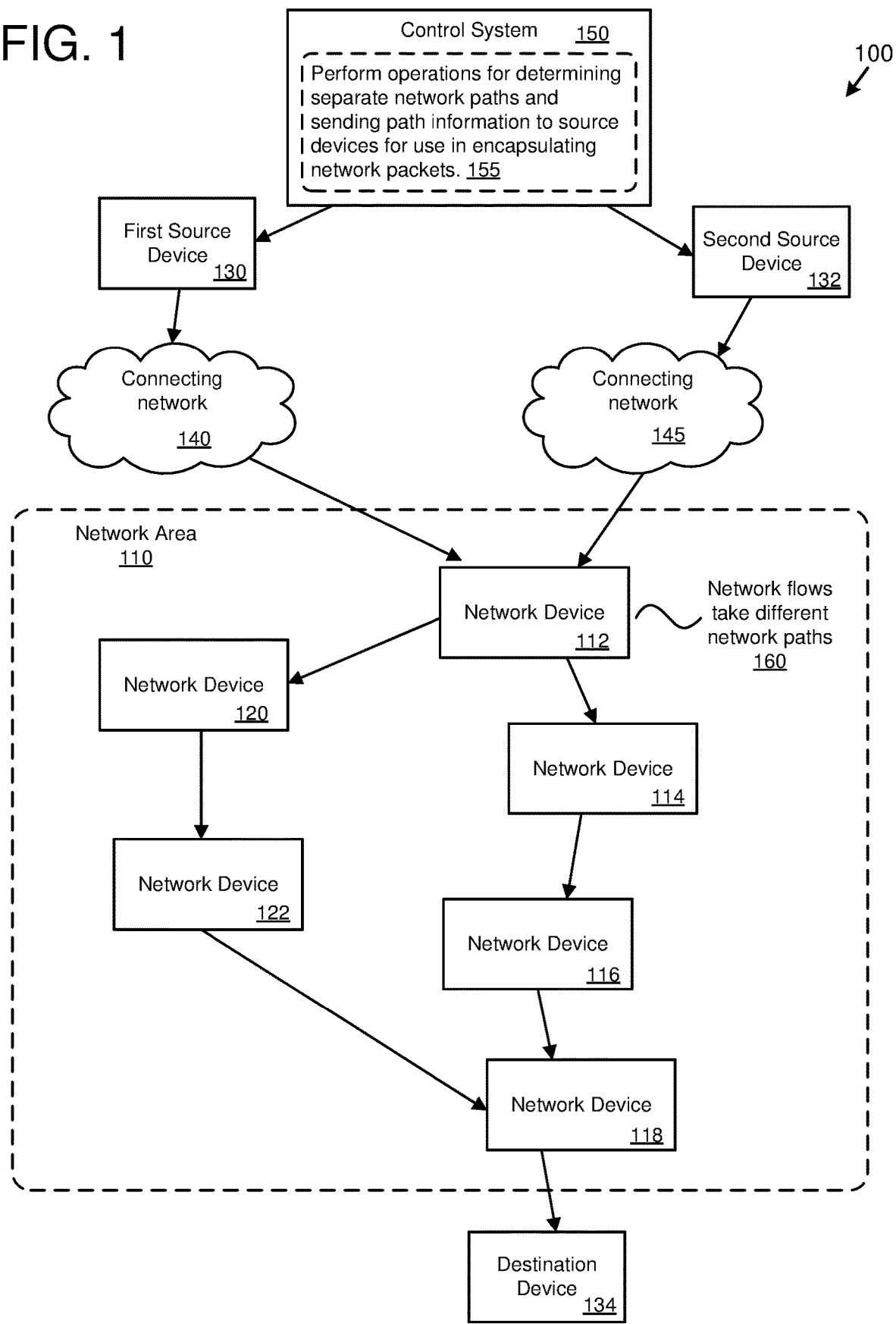
FIG. 1 is a diagram of an example network environment in which separate network paths are determined and path information is sent to source devices for use in encapsulating network packets.

The following description is directed to technologies for ensuring separate network paths within a packet-switched network for network traffic between multiple source devices and a destination device, so that each source device to destination device path is separate from the other source device to destination device paths for at least some portion along the paths. In some solutions, a control system receives a request to keep network flows separate from a first source device to a destination device and from a second source device to the destination device so that the network flows traverse separate routers and/or separate links for at least a portion of the separate network paths. The control system determines separate network paths using network topology information and hashing information. The control system sends path information to the source devices for use in encapsulating network packets to use the separate network paths. In some solutions, a network path separation list is received that comprises an indication of a first source device, a second source device, and a destination device. Network packets can then be directed along separate network paths based on the network path separation lists. In some solutions, a request is received to use separate network paths for network traffic from a first source device to a destination device and network traffic from a second source device to the destination device. Flow description information is calculated to satisfy the request and sent to a group of network devices within a packet-switched network for use in ensuring that network flows remain separate according to the flow description information.

In a packet-switched network, there are typically multiple routes (paths) through the network from a number of source devices to a destination device. However, for a given destination device, the network paths will typically converge at some intermediate device (e.g., an intermediate router) between the source devices and the destination device. Once network packets reach the intermediate device, they will typically take the same network path to the destination device. While this type of routing operation works well and performs efficiently in many situations, there are some situations where it is problematic. For example, if a network device fails from the point at which the same network path begins, the destination device will be unreachable from all source devices. At some point, the network will typically route around the failed device, but doing so takes time and can cause disruptions on the network. In situations where high availability and/or reliability are desired, such disruptions can pose a significant problem. For example, if two source devices are monitoring a destination device (e.g., to determine whether the destination device is operating correctly) and a router along the path (at a point where the paths are the same) between the two source devices and the destination device fails, then the two source devices will be unable to assess the condition of the destination device, or determine, incorrectly, that the destination device has failed.

Some solutions exist for distributing network traffic among multiple network paths, such as equal-cost multi-path routing (ECMP). However, with ECMP, the network traffic is generally distributed in a load-balancing arrangement between multiple paths. In addition, ECMP does not provide for identifying specific source devices and destination devices and enforcing separate network paths among the network paths taken by the specific source devices.

Using the technologies described herein, the use of separate network paths can be ensured between two or more source devices and a destination device. The separate network paths traverse separate network devices (e.g., separate routers, switches, and/or other network devices) for at least a portion of the network paths and/or traverse separate links (network links) for at least a portion of the network paths (e.g., two network devices may have multiple links between them and the separate network paths could take different network links). For example, use of separate network paths can be enforced by having one or more of the network devices along the path send network traffic along separate paths depending on whether network traffic originated from a first source device or a second source device.

Using the technologies described herein can provide advantages in terms of availability and/or reliability. For example, if one source device is unable to contact a given destination device due to a network issue (e.g., a router that has failed, is congested, or is not operating correctly), then another source device, whose network traffic takes a different path that does not include the network device with the issue, can still contact the given destination device. For example, if two source devices are monitoring the same destination device and one of the source devices cannot reach the destination device due to a network issue along its path, then the other source device may still be able to reach the destination device if its network traffic takes a different path.

FIG. 1 is a diagram of an example network environment 100 in which separate network paths are determined and path information is sent to source devices for use in encapsulating network packets. In the example network environment 100, a simplified network area 110 is depicted that includes a number of network devices (e.g., routers, switches, or other types of network devices), including network devices 112, 114, 116, 118, 120, and 122. For example, the network area 110 could represent a simplified version of network devices that send and receive network traffic within a local network (e.g., within a data center) of an organization. While only a few network devices are depicted for ease of illustration, in a typical network environment there can be many more network devices organized into various network topologies (e.g., topologies such as multi-tier networks).

In the example network environment 100, there are two source devices, a first source device 130 and a second source device 132. For example, the source devices can be computing devices (e.g., server computers, desktop computers, laptops, virtual machines, or other types of computing devices). The sources devices are connected via connecting networks to the network devices of the network area 110. Specifically, the first source device 130 is connected via connecting network 140 to network device 112, and the second source device 132 is connected via connecting network 145 to network device 112. The connecting networks represent intermedia devices (e.g., routers, switches, etc.) between the source devices and the network devices of the network area 110. In some implementations, the connecting network 140 and 145 may not be present (e.g., the source devices can be connected directly to one of the network devices of the network area 110). While only two source devices are depicted, any number of additional source devices may be present and can participate in the technologies described herein.

In the example network environment 100, there is one destination device 134 depicted. For example, the destination device 134 can be a computing device (e.g., a server computer, desktop computer, laptop, virtual machine, or another type of computing device). While only one destination device is depicted, any number of additional destination devices may be present and can participate in the technologies described herein. In some implementations, additional network devices (e.g., routers, switches, etc.) may be present between the network device 118 and the destination device 134.

A control system 150 is also present in the example network environment 150. The control system 150 can be implemented by software and/or hardware resources running on one or more computing devices (e.g., as a centralized service, a distributed service, or multiple instances of a service). As depicted at 155, the control system 150 performs operations for determining separate network paths and sending path information to source devices (e.g., to first and second source devices 130 and 132) for use in encapsulating network packets so that the network packets take the separate paths through at least a portion of the network area 110.

For example, if the technologies described herein for ensuring separate network paths are not implemented, then network traffic from both the first source device 130 and the second source device 132 would take the same path through the network to the destination device 134. Specifically, network traffic from both source devices would reach network device 112, then proceed to network devices 114, 116, and 118, and then on to the destination device 134.

Using the technologies described herein, network traffic from the source devices can be directed along separate network paths to the destination device 134. For example, the first source device 130 can encapsulate network packets of a first network flow and send them to the destination device 134. The second source device 132 fan also encapsulate network packets of a second network flow and send them to the destination device 134. Network device 112 can send the different network flows via different network paths, as depicted at 160. For example, network device 112 can direct the network packets of the first network flow (network packets addressed from the first source device 130) to network device 114 (e.g., via a first network port of network device 112). The network device 112 can direct the network packets of the second network flow (network packets addressed from the second source device 132) to network device 120 (e.g., via a second network port of network device 112).

In some implementations, the encapsulation is performed by the source devices themselves (e.g., by the first source device 130 and the second source device 132). In some implementations, the encapsulation is performed by a component attached to the source device (e.g., a networking component attached to the network port). In some implementations, the encapsulation is performed by a network device receiving network packets from a source device (e.g., by a next-hop switch). For example, the control system 150 could send the path information to a network switch associated with the first source device 130 (e.g., a network switch within the connecting network 140) and the network switch could encapsulate network packets from the first source device 130. The control system 150 could send path information to a network switch (e.g., a different network switch) associated with the second source device 132 (e.g., a network switch within the connecting network 145) and the network switch could encapsulate network packets from the second source device 132.

The control system 150 can determine the separate network paths using topology information (e.g., defining the network devices and computing devices in the network and the links between them) for the network (e.g., for network area 110) and/or using hashing information (e.g., defining the hashing functions used by the network devices to determine which network port to use for sending network packets). For example, the control system 150 can determine the specific network path information needed by each source device so each source device's encapsulated network packets will take the desired path through the network to the destination device. In some implementations, the control system 150 calculates different network path indicators (e.g., different source port numbers) for each of the source devices to use. For example, the control system 150 can calculate a first network path indicator (e.g., a first source port number) that, when hashed using the hashing function used by network device 112, would cause network packets encapsulated according to the first network path indicator from the first source device 130 to be directed to network device 114. The control system 150 can calculate a second network path indicator (e.g., a second source port number) that, when hashed using the hashing function used by network device 112, would cause network packets encapsulated according to the second network path indicator from the second source device 132 to be directed to network device 120. The control system 150 can send the first network path indicator to the first source device 130 and the second network path indicator to the second source device 132.

In some implementations, the network path indicators are source port numbers. In some implementations, the network path indicators are stored in network protocol header information of the encapsulating network packet. For example, in implementations where UDP packets are used as encapsulating network packets, the network path indicators can be stored in the source port field of the encapsulating UDP packet header. For example, a device (e.g., a router) can receive the encapsulating network packet, examine the UDP header for the network path indicator, and send the encapsulating network packet along a network path as indicated by the network path indicator (e.g., an odd value network path indicator can specify a first network path and an even value network path indicator can specify a second network path). In other implementations, the network path indicators can be stored other places (e.g., in other fields of the encapsulating packet header). The network path indicators can be implemented using encapsulating network packet headers other than source port numbers, such as destination port numbers, source IP addresses (e.g., where the source device has multiple IP addresses), destination IP addresses (e.g., where the destination device has multiple IP addresses), custom header field data, etc.

In some implementations, the control system 150 calculates different hash values for each of the network paths. The source devices then use the hash values to determine which network path indicator to use to achieve the indicated hash value. For example, the control system 150 can determine a first hash value and send it to the first source device 130. The first source device 130 can calculate a network path indicator to use (e.g., a specific source port number) that will hash to the received first hash value. The first source device 130 can then encapsulate network packets according to the network path indicator which will then follow the first network path through the network (e.g., from network device 112 to 114, 116, 118, and then to destination device 134). The control system 150 can determine a second hash value (different from the first hash value) and send it to the second source device 132. The second source device 132 can calculate a network path indicator (different than the network path indicator calculated by the first source device 130) to use (e.g., a specific source port number different from that calculated by the first source device 130) that will hash to the received second hash value. The second source device 132 can then encapsulate network packets according to the network path indicator which will then follow the second path through the network (e.g., from network device 112 to 120, 122, and then to destination device 134).

Instead of single network path indicators or single hash values, the control system 150 can determine groups of network path indicators or groups of hash values. For example, the control system 150 can determine a first group of network path indicators, or a first range of hash values, for the first path and a second group of network path indicators, or a second range of hash values, for the second path.

While the example network environment 100 only shows one network device 112 that directs network packets via different paths depending on which source device sent the network packets, other network environments may have many network devices that make such decisions for directing network traffic among different network paths (e.g., two or more network paths) based on which source device sent the network packets (e.g., via network path indicators in the encapsulating packet headers).

Figure 2:
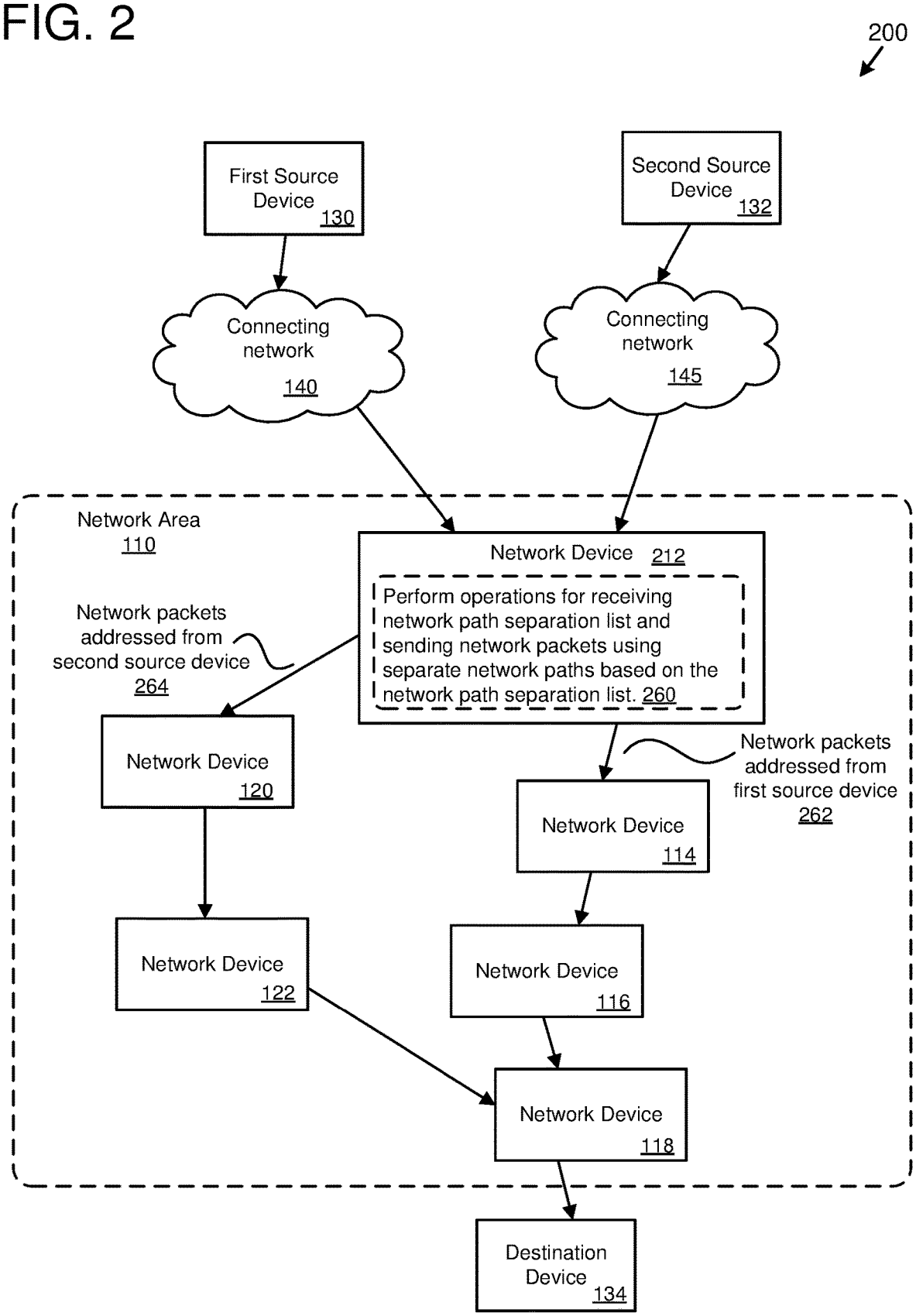
FIG. 2 is a diagram of an example network environment in which separate network paths are determined based on network path separation lists.

FIG. 2 is a diagram of an example network environment 200 in which separate network paths are determined based on network path separation lists. The example network environment 200 is similar to that depicted in FIG. 1, but with some differences in how the different network paths are determined. In the example network environment 200, like in the example network environment 100, the first source device 130 and the second source device 132 are sending network packets (e.g., have established network flows) with the destination device 134, where the network packets are routed via network devices of the network area 110.

In the example network environment 200, network path separation lists are used to determine when network traffic from different source devices should take different network paths. A network path separation list is a collection of information (e.g., a configuration) that specifies a number of source devices and a destination device. For example, the network path separation list can list two or more source devices by their IP addresses and a destination device by its IP address. For example, a network path separation list associated with the example network environment 200 can list: [first source device 130 IP address, second source device 132 IP address, destination device 134 IP address]. The network path separation list indicates that network traffic (e.g., network flows) for each of the source devices should take different paths through at least a portion of the network to the destination device. In a typical network environment, there may be many network traffic separation lists (e.g., a collection of network path separation lists) that each specify two or more source devices and a destination device.

In the example network environment 200, network device 212 has received a network path separation list, as depicted at 260. The network path separation list lists the first source device 130, the second source device 132, and the destination device 134. Based on the network path separation list, the network device 212 sends network packets using separate network paths depending on which source device they are coming from. For example, the network device 212 can send network packets (e.g., a network flow) that are addressed from (e.g., has a sender IP address associated with) the first source device 130 via a first network path (e.g., via a first network port) to network device 114, as depicted at 262. The network device 212 can send network packets (e.g., a network flow) that are addressed from (e.g., has a sender IP address associated with) the second source device 132 via a second network path (e.g., via a second network port) to network device 120, as depicted at 264. In some implementations, the network device 212 maintains a record of the network port that was used to send network traffic addressed from a given source device that is part of a network path separation list. Using this information, the network device 212 can direct network traffic from another one of the source devices that is part of the network path separation list to a different network port.

While the example network environment 200 only shows one network device 212 that receives network path separation lists and directs network packets via separate network paths according to the network path separation lists, other network environments may have many network devices that receive network path separation lists and make such decisions for directing network traffic among different network paths (e.g., two or more network paths). For example, some or all of the network devices in the network area 110 could perform the operations depicted at 260.

In some implementations, network path separation lists are distributed within the example network environment 200 (e.g., to some or all of the network devices in the network area 110) using a broadcast mechanism. For example, a broadcast message can be sent to some or all of the network devices in the network area 110. The broadcast message can contain a list of network path separation lists that are to be monitored by the network devices. The broadcast message can be sent, for example, by a control system (e.g., a control system similar to control system 150), by one of the network devices, or by another computing device or service within, or external to, the network area 110.

In some implementations, network path separation lists are distributed within the example network environment 200 (e.g., to some or all of the network devices in the network area 110) using network packets from the source devices. For example, a first network packet of a communication from a source device to a destination device (e.g., the first network packet at the beginning of a network flow from first source device 130 to destination device 134) can be a special network packet (e.g., identified by network packet header parameters as containing a network path separation list). The special network packet can be identified by the network devices (e.g., by network device 212 and/or by other network devices within the network area 110) and the network path separation list can be extracted and stored for use in determining when separate network paths should be used. For example, the special network packet can comprise a network path separation list that lists the first source device 130, the second source device 132, and the destination device 134.

In some implementations, the example network environment 200 uses source-based routing to determine when to send network packets addressed from one source device to a destination device along a different network path from network packets addressed from another source device to the destination device. For example, a collection of routers that implement a source-based routing protocol can use the network path separation lists to perform routing based on the source of the network packets and direct different source devices along different network paths according to the information in the network path separation lists.

Figure 3:
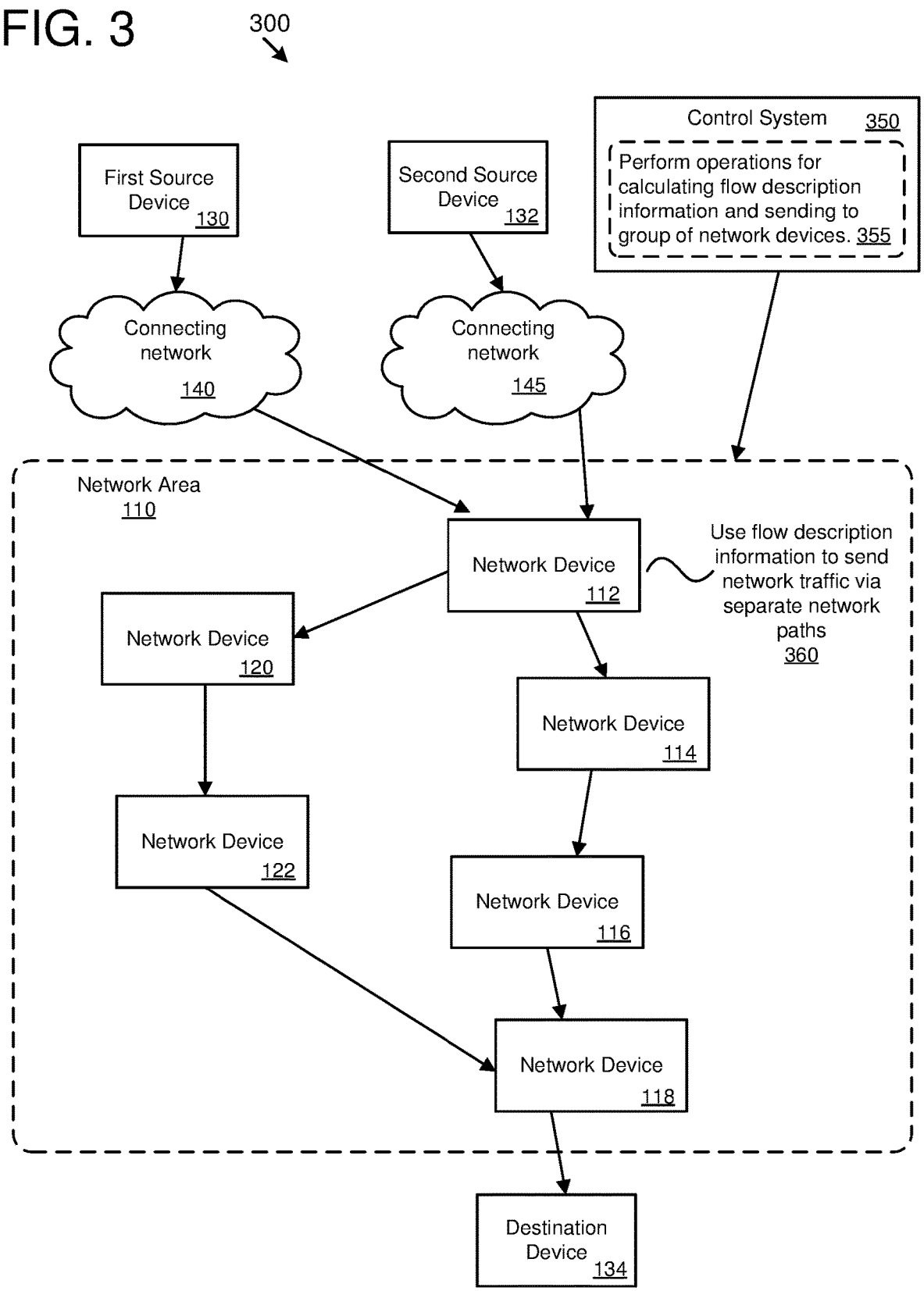
FIG. 3 is a diagram of an example network environment in which flow description information is determined and sent to network devices for use in keeping network flows separate.

FIG. 3 is a diagram of an example network environment 300 in which flow description information is determined and sent to network devices for use in keeping network flows separate. The example network environment 300 is similar to that depicted in FIG. 1, but with some differences in how the different network paths are determined. In the example network environment 300, like in the example network environment 100, the first source device 130 and the second source device 132 are sending network packets (e.g., have established network flows) with the destination device 134, where the network packets are routed via network devices of the network area 110.

In the example network environment 300, a control system 350 is present. The control system 350 can be implemented by software and/or hardware resources running on one or more computing devices (e.g., as a centralized service, a distributed service, or multiple instances of a service). As depicted at 355, the control system 350 performs operations for calculating flow description information and sending the flow description information to network devices (e.g., to some or all of the network devices within the network area 110). The flow description information is used by the network devices to decide which network flows should take separate network paths through the network.

For example, the control system 350 can decide to use separate network paths for network traffic from the first source device 130 to the destination device 134 and from the second source device 132 to the destination device 134. For example, the determination can be based on a request that is received from another computing device or service, from a network administrator, from one of the devices involved in the network flows (e.g., from one of the source devices), or from another source. In some implementations, the determination is made automatically. For example, the automatic determination can be based on an analysis of network flows (e.g., automatically determining to separate network flows to a specific service of the destination device). The control system 350 can calculate flow description information to satisfy the request. For example, the flow description information can indicate which network flows are to be kept separate (e.g., indicating that network flows from the first source device 130 to the destination device 134 are to be kept separate from network flows from the second source device 132 to the destination device 134). The control system 350 can send the flow description information to a group of network devices (e.g., to some or all of the network devices within the network area 110). The network devices can use the flow description information for flow-based routing to switch between separate network paths for different flows according to the flow description information. For example, as depicted at 360, network device 112 can receive a first network flow from the first source device 130 to the destination device 134 and send it along a first network path (e.g., via a first network port) to network device 114. The network device 112 can receive a second network flow from the second source device 132 to the destination device 134 and send it along a second network path (e.g., via a second network port) to network device 120.

The flow description information can identify a number of source devices (e.g., two or more source devices) and a destination device as well as a description of the type of network flow or flows to be kept separate. In some implementations, all network flows are to be kept separate (e.g., regardless of network protocol or port number). In some implementations, the flow description information identifies one or more specific types of network flows that are to be kept separate, which can be identified by network protocol and port number (e.g., TCP flows with destination port 80).

In some implementations, the network environment 300 is part of a software defined network. For example, the control system 350 can be used by network administrators or automated services to define the network behavior (e.g., routing operation) of the network devices of the network area 110. Flow description information can then be determined to implement the desired network behavior and distributed to the network devices of the network area 110.

The flow description information can include indications of the network flows to be kept separate.

Figure 4:
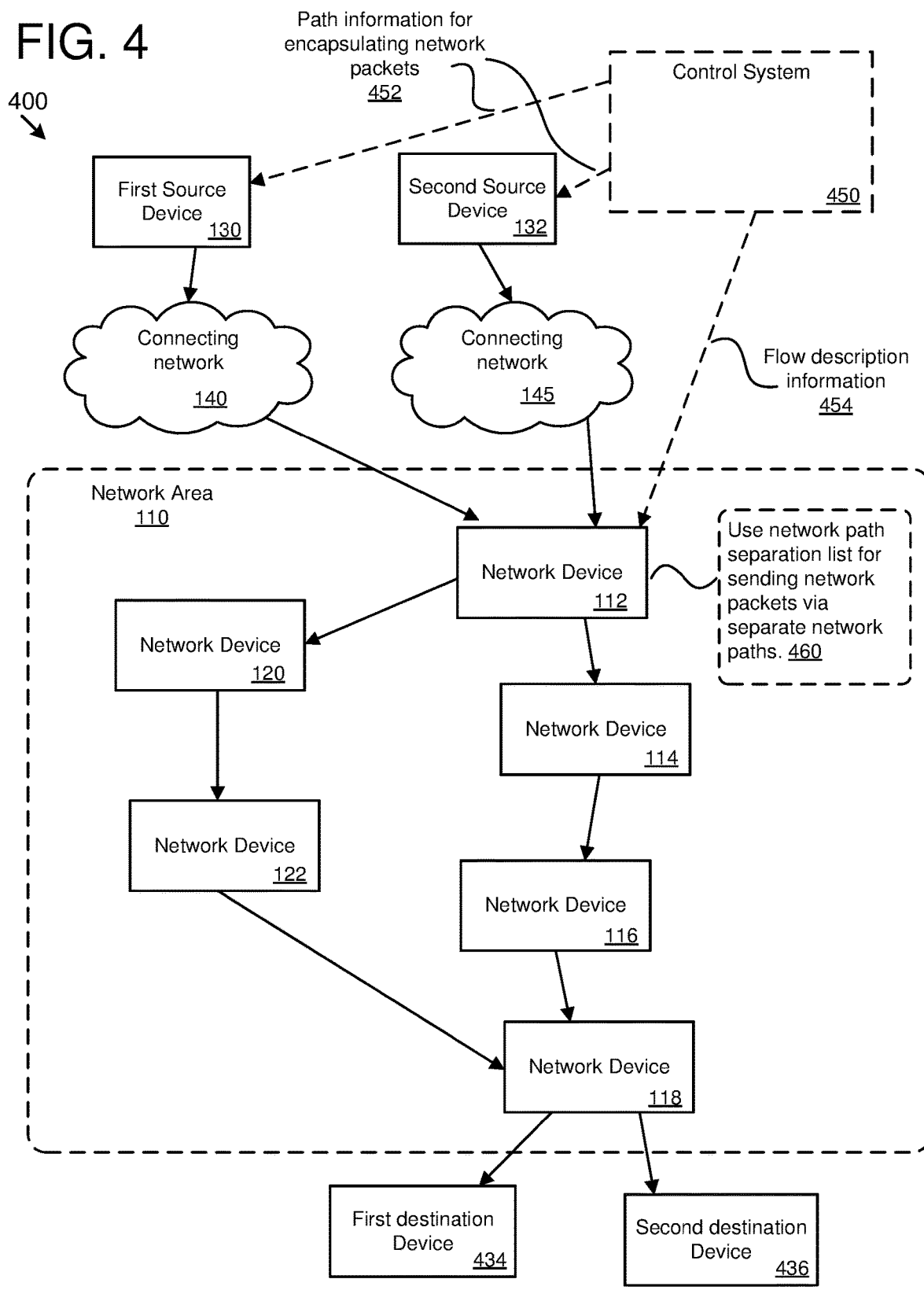
FIG. 4 is a diagram of an example network environment in which use of separate network paths are enforced between pairs of source and destination devices.

In some implementations, the use of separate network paths are ensured between pairs of source and destination devices (e.g., instead of two source devices and one destination device). For example, a first network path can be used for network traffic between a first source device and a first destination device, and a second network path can be used for network traffic between a second source device and a second destination device. In this way, any number of source device, destination device pairs can each use a different path through the computer network (e.g., for at least a portion of the different paths). In some solutions, a control system receives a request to keep network flows separate from a first source device to a first destination device and from a second source device to a second destination device so that the network flows traverse separate routers and/or separate links for at least a portion of the separate network paths. The control system determines separate network paths using network topology information and hashing information. The control system sends path information to the source devices for use in encapsulating network packets to use the separate network paths. In some solutions, a network path separation list is received that comprises an indication of a first source device, a first destination device, a second source device, and a second destination device. Network packets can then be directed along separate network paths based on the network path separation lists. In some solutions, a request is received to use separate network paths for network traffic from a first source device to a first destination device and network traffic from a second source device to a second destination device. Flow description information is calculated to satisfy the request and sent to a group of network devices within a packet-switched network for use in ensuring that network flows remain separate according to the flow description information FIG. 4 is a diagram of an example network environment 400 in which use of separate network paths are enforced between pairs of source and destination devices. The example network environment 400 is similar to that depicted in FIGS. 1, 2, and 3, but instead of using different network paths between two source devices and a destination device, different network paths are used between pairs of source device and destination device. For example, in the example network environment 400, network traffic between the first source device 130 and the first destination device 434 can take a different path through the computer network (e.g., traverse one or more different network devices within the network area 110) from network traffic between the second source device 132 and the second destination device 436.

In some implementations, use of different network paths are determined by a control system 450 using the techniques described with regard to FIG. 1. For example, the control system 450 can determine the separate network paths (e.g., from topology information and/or hashing information), determine the specific path information needed by each source device, and send the path information to the source devices for use in encapsulating network packets. For example, the control system 450 can send path information to the first source device 130 and the second source device 132, as indicated at 452. The first source device 130 can use the path information (e.g., a first network path indicator) to encapsulate a flow of network packets sent to the first destination device 434. The second source device 132 can use the path information (e.g., a second network path indicator) to encapsulate a flow of network packets sent to the second destination device 436.

Network device 112 can send the different network flows via different network paths. For example, network device 112 can direct the network packets of the first network flow (network packets addressed from the first source device 130 to the first destination device 434) to network device 114 (e.g., via a first network port of network device 112). The network device 112 can direct the network packets of the second network flow (network packets addressed from the second source device 132 to the second destination device 436) to network device 120 (e.g., via a second network port of network device 112).

In some implementations, use of different network paths are determined by the network devices using the techniques described with regard to FIG. 2, which uses network path separation lists. For example, network device 112 can receive a network path separation list specifying that network traffic from the first source device 130 to the first destination device 434 should use a different network path from network traffic from the second source device 132 to the second destination device 436. For example, a network path separation list associated with the example network environment 400 can list: [first source device 130 IP address, first destination device 434 IP address; second source device 132 IP address, second destination device 436 IP address]. Network device 112 can then use the network path separation list for sending network packets via separate network paths, as depicted at 460. In a typical network environment, there may be many network traffic separation lists (e.g., a collection of network path separation lists) that each specify two or more pairs of source device and destination device, where each pair of source and destination device are to use separate paths.

In some implementations, use of different network paths are determined by the network devices using the techniques described with regard to FIG. 3, in which flow description information is determined and sent to network devices for use in keeping network flows separate. For example, the control system 450 can decide to use separate network paths for network traffic from the first source device 130 to the first destination device 434 and from the second source device 132 to the second destination device 436. For example, the control system 450 can receive a request (e.g., from an external service) to use separate network paths or automatically determine to use separate network paths (e.g., by analyzing traffic flow information). The control system 450 can calculate flow description information to satisfy the request. For example, the flow description information can indicate which network flows are to be kept separate (e.g., indicating that network flows from the first source device 130 to the first destination device 434 are to be kept separate from network flows from the second source device 132 to the second destination device 436). The control system 450 can send the flow description information to a group of network devices (e.g., to some or all of the network devices within the network area 110), as depicted at 454. The network devices can use the flow description information for flow-based routing to switch between separate network paths for different flows according to the flow description information. For example network device 112 can receive a first network flow from the first source device 130 to the first destination device 434 and send it along a first network path (e.g., via a first network port) to network device 114. The network device 112 can receive a second network flow from the second source device 132 to the second destination device 436 and send it along a second network path (e.g., via a second network port) to network device 120.

While the example network environment 400 two source, destination pairs (the first pair being first source device 130 and first destination device 434, and the second pair being second source device 132 and second destination device 436), the environment supports any number of source, destination pairs whose network traffic is to be sent via different network paths. In addition, each pair can have one or more devices (e.g., a source, destination pair with one or more source devices and one or more destination devices).

Figure 5:
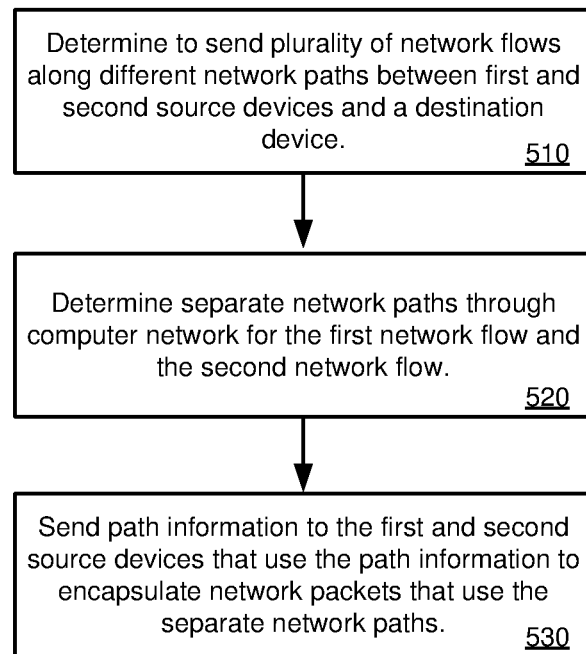
FIG. 5 is a flowchart of an example method for ensuring that separate network paths are used between source devices and a destination device using encapsulation.

FIG. 5 is a flow chart of an example method 500 for ensuring that separate network paths are used between source devices and a destination device. The example method ensures that separate network paths are used by encapsulating network packets sent by the source devices. For example, the example method 500 can be implemented by a control system, such as control system 150.

At 510, a determination is made to send a plurality of network flows along different network paths in a computer network between a first source device and a destination device, and a second source device and the destination device. For example, a first network flow between the first source device and the destination device can take a separate path through the network with respect to a second network flow between the second source device and the destination device. In some implementations, the determination is made based on receiving a request to keep the plurality of network flows separate (e.g., a request from an external service). In some implementations, the determination is made automatically. For example, the automatic determination can be based on an analysis of network flows (e.g., automatically determining to separate network flows to a specific service of the destination device).

At 520, separate network paths are determined through the computer network for the first network flow and the second network flow. Separate network paths are those that traverse different routers for at least a portion of the paths. For example, the paths may begin at different network locations but then converge at a specific router that directs each network flow along a different outbound path to the destination device. In some implementations, the separate network paths are determined based on topology of the computer network and/or hashing information for the computer network.

At 530, path information is sent to the first source device and the second source device. The first and second source devices use the path information to encapsulate network packets that will then take the separate network paths through the computer network to the destination device.

Figure 6:
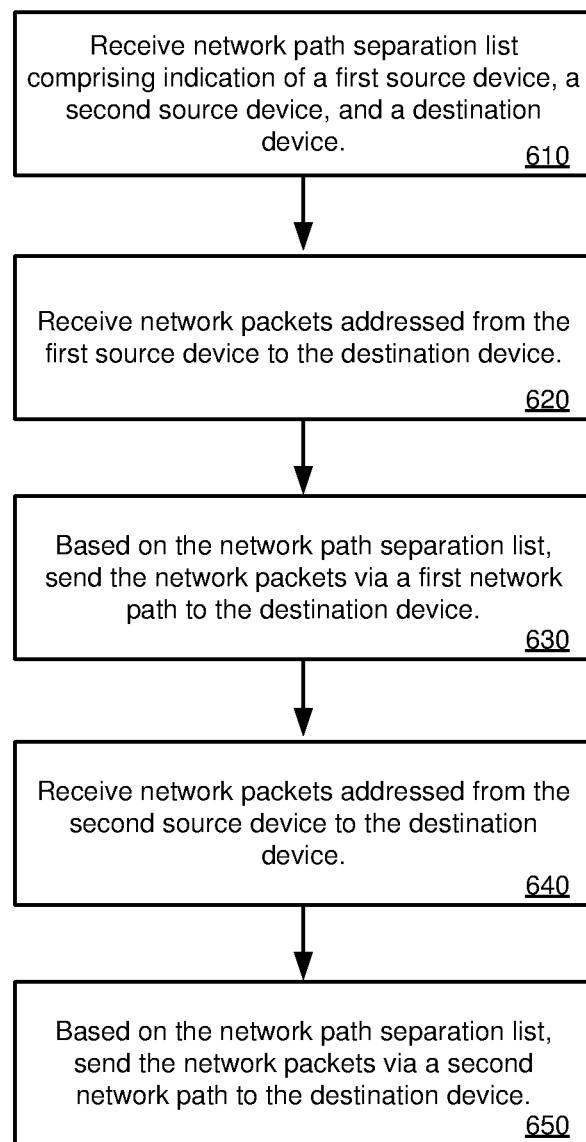
FIG. 6 is a flowchart of an example method for ensuring that separate network paths are used between source devices and a destination device using network path separation lists.

FIG. 6 is a flow chart of an example method 600 for ensuring that separate network paths are used between source devices and a destination device. The example method uses network path separation lists to ensure that network devices use separate network paths through the network. For example, the example method 600 can be implemented by a network device (e.g., a router or switch), such as network device 212.

At 610, a network path separation list is obtained. The network path separation list comprises an indication of a first source device, a second source device, and a destination device.

At 620, network packets are received that are addressed from the first source device to the destination device. At 630, based on the network path separation list, the network packets received at 620 are sent via a first network path through a packet-switched network to the destination device. For example, the network packets can be sent along the first network path via a first network port of a router.

At 640, network packets are received that are addressed from the second source device to the destination device. At 650, based on the network path separation list, the network packets received at 640 are sent via a second network path through the packet-switched network to the destination device. For example, the network packets can be sent along the second network path via a second network port of the router.

Figure 7:
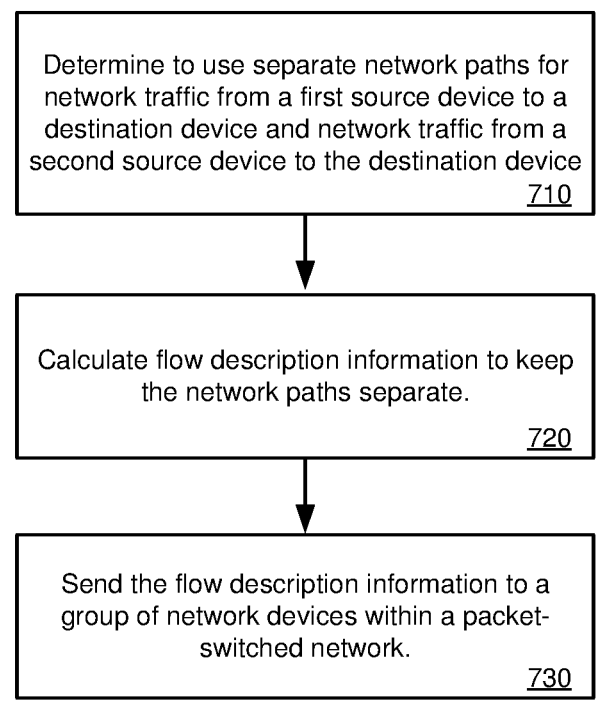
FIG. 7 is a flowchart of an example method for ensuring that separate network paths are used between source devices and a destination device using flow description information.

FIG. 7 is a flow chart of an example method 700 for ensuring that separate network paths are used between source devices and a destination device. The example method ensures that separate network paths are used by calculating flow description information and sending the flow description information to a group of network devices. For example, the example method 700 can be implemented by a control system, such as control system 350.

At 710, a determination is made to use separate network paths for network traffic from a first source device to a destination device and network traffic from a second source device to the destination device with a packet-switched network. In some implementations, the determination is made based on receiving a request to use separate network paths (e.g., a request from an external service). In some implementations, the determination is made automatically. For example, the automatic determination can be based on an analysis of network traffic (e.g., automatically determining to separate network traffic to a specific service of the destination device).

At 720, flow description information is calculated to satisfy the request to keep the network paths separate. The flow description information indicates use of separate routers for at least a portion of the separate network paths.

At 730, the flow description information is sent to a group of network devices within a packet-switched network. The network devices make routing decisions based on the flow description information. For example, a router can use the flow description information to direct a first network flow from the first source device to the destination device along a first network path and direct a second network flow from the second source device to the destination device along a second network path.

Figure 8:
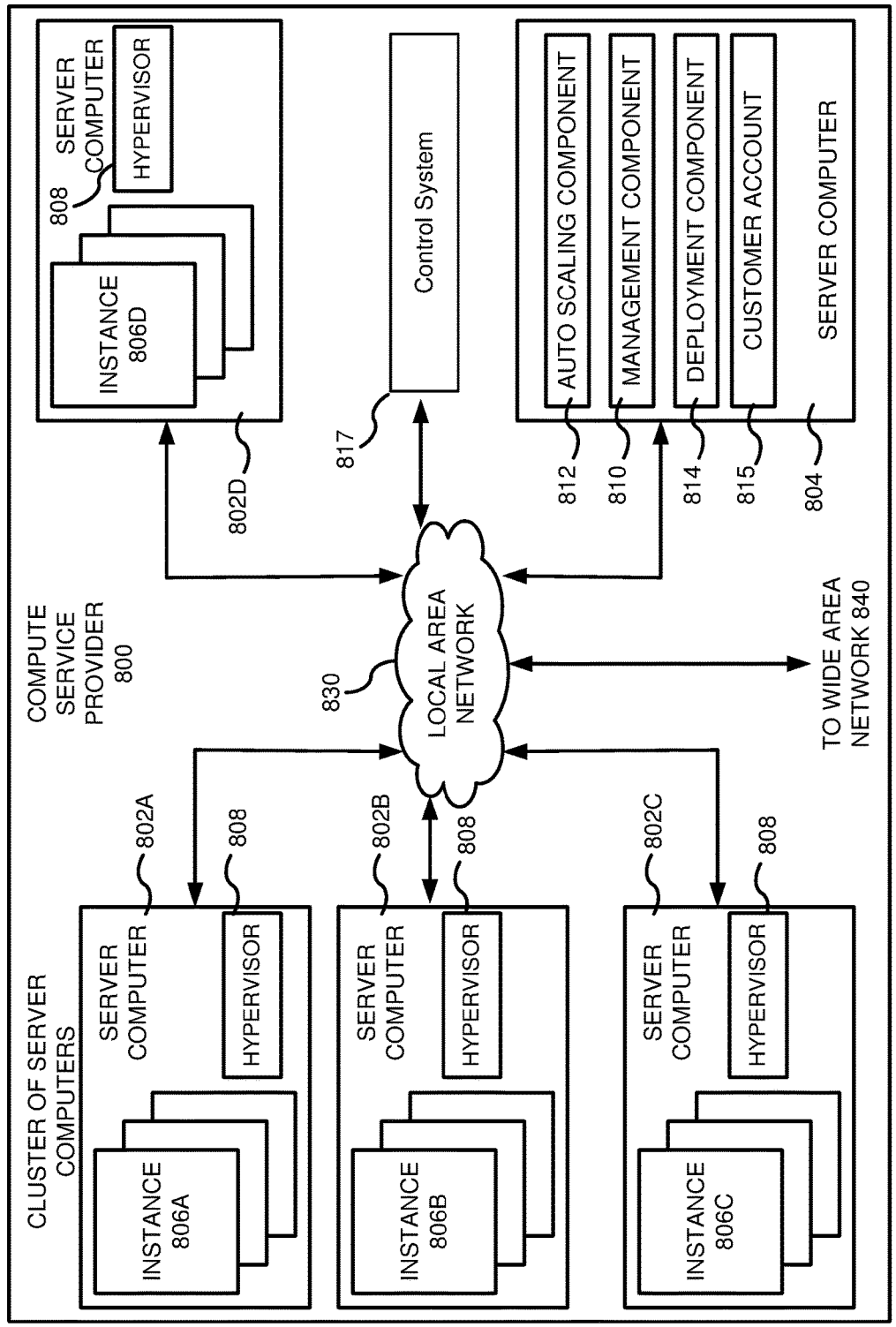
FIG. 8 is an example system diagram showing a plurality of virtual machine instances running in a multi-tenant environment.

FIG. 8 is a computing system diagram of a network-based compute service provider 800 that illustrates one environment in which embodiments described herein can be used. By way of background, the compute service provider 800 (i.e., the cloud provider) is capable of delivery of computing and storage capacity as a service to a community of end recipients. In an example embodiment, the compute service provider can be established for an organization by or on behalf of the organization. That is, the compute service provider 800 may offer a "private cloud environment." In another embodiment, the compute service provider 800 supports a multi-tenant environment, wherein a plurality of customers operate independently (i.e., a public cloud environment). Generally speaking, the compute service provider 800 can provide the following models: Infrastructure as a Service ("IaaS"), Platform as a Service ("PaaS"), and/or Software as a Service ("SaaS"). Other models can be provided. For the IaaS model, the compute service provider 800 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 800 using networked client devices, such as desktop computers, laptops, tablets, smartphones, etc. running web browsers or other lightweight client applications. Those skilled in the art will recognize that the compute service provider 800 can be described as a "cloud" environment.

The particular illustrated compute service provider 800 includes a plurality of server computers 802A-802D. While only four server computers are shown, any number can be used, and large centers can include thousands of server computers. The server computers 802A-802D can provide computing resources for executing software instances 806A-806D. In one embodiment, the instances 806A-806D are virtual machines. As known in the art, a virtual machine is an instance of a software implementation of a machine (i.e. a computer) that executes applications like a physical machine. In the example, each of the servers 802A-802D can be configured to execute a hypervisor 808 or another type of program configured to enable the execution of multiple instances 806 on a single server. For example, each of the servers 802A-802D can be configured (e.g., via the hypervisor 808) to support one or more virtual machine slots, with each virtual machine slot capable of running a virtual machine instance (e.g., server computer 802A could be configured to support three virtual machine slots each running a corresponding virtual machine instance). Additionally, each of the instances 806 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 804 can be reserved for executing software components for managing the operation of the server computers 802 and the instances 806. For example, the server computer 804 can execute a management component 810. A customer can access the management component 810 to configure various aspects of the operation of the instances 806 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 812 can scale the instances 806 based upon rules defined by the customer. In one embodiment, the auto scaling component 812 allows a customer to specify scale-up rules for use in determining when new instances should be instantiated and scale-down rules for use in determining when existing instances should be terminated. The auto scaling component 812 can consist of a number of subcomponents executing on different server computers 802 or other computing devices. The auto scaling component 812 can monitor available computing resources over an internal management network and modify resources available based on need.

A deployment component 814 can be used to assist customers in the deployment of new instances 806 of computing resources. The deployment component can have access to account information associated with the instances, such as who is the owner of the account, credit card information, country of the owner, etc. The deployment component 814 can receive a configuration from a customer that includes data describing how new instances 806 should be configured. For example, the configuration can specify one or more applications to be installed in new instances 806, provide scripts and/or other types of code to be executed for configuring new instances 806, provide cache logic specifying how an application cache should be prepared, and other types of information. The deployment component 814 can utilize the customer-provided configuration and cache logic to configure, prime, and launch new instances 806. The configuration, cache logic, and other information may be specified by a customer using the management component 810 or by providing this information directly to the deployment component 814. The instance manager can be considered part of the deployment component.

Customer account information 815 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 830 can be utilized to interconnect the server computers 802A-802D and the server computer 804. The network 830 can comprise a Clos network. The network 830 can be a local area network (LAN), such as a multi-tiered network (e.g., Clos network), and can be connected to a wide area network (WAN) 840 so that end users can access the compute service provider 800. The wide area network 840 can connect to a border network fabric providing access to the internet and/or to other networks (e.g., peering connections to other network locations). It should be appreciated that the network topology illustrated in FIG. 8 has been simplified and that many more networks and networking devices can be utilized to interconnect the various computing systems disclosed herein.

In some implementations, a control system 817 performs operations associated with keeping network traffic flows separate between multiple source devices and a destination device. For example, the control system 817 can perform operations for determining separate network paths and sending path information to source devices for use in encapsulating network packets. The control system 817 can also perform operations for calculating flow description information and sending the flow description information to a group of network devices.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

Figure 9:
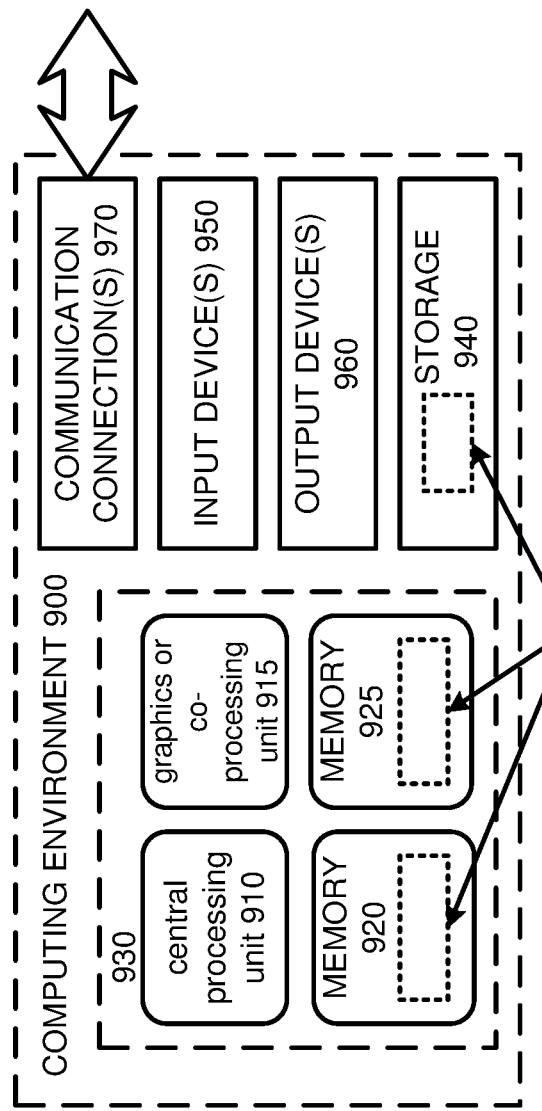
FIG. 9 depicts a generalized example of a suitable computing environment in which the described innovations may be implemented.

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. Therefore, what is claimed as the invention is all that comes within the scope of these claims.

What is claimed is:

1. A computing device, the computing device comprising:
a processing unit; and
a network interface;
the computing device configured to perform operations, the operations comprising:
   determining to send a plurality of network flows along different network paths in a computer network, wherein a first network flow of the plurality of network flows is from a first source device to a first destination device, and wherein a second network flow of the plurality of network flows is from a second source device to a second destination device;
   determining separate network paths through the computer network for the first network flow and the second network flow, wherein the separate network paths traverse separate routers or links for at least a portion of the separate network paths, wherein the separate network paths are determined based on a topology of the computer network and hashing information for the computer network, and wherein determining the separate network paths through the computer network comprises:
      using the hashing information to calculate different network path indicators for the separate network paths; and
   sending path information to the first source device and the second source device, wherein the first and second source devices use the path information to encapsulate network packets that use the separate network paths through the computer network for the first and second network flows, wherein sending the path information comprises:
      sending a first network path indicator to the first source device and a second network path indicator to the second source device, wherein the first and second network path indicators are used to encapsulate network packets that take the separate network paths to the first and second destination devices;
   wherein routers within the computer network route network packets of the first network flow and the second network flow via the separate network paths to the first and second destination devices.

2. The computing device of claim 1, wherein the first network path indicator is a first source port that the first source device uses to encapsulate network packets of the first network flow, and wherein the second network path indicator is a second source port that the second source device uses to encapsulate network packets of the second network flow.

3. The computing device of claim 1, the operations further comprising:
   determining separate network paths for one or more additional network flows between one or more additional source devices and one or more additional destination devices; and
   sending path information to the one or more additional source devices.

4. The computing device of claim 1, wherein the first source device encapsulates network packets using User Datagram Protocol (UDP) encapsulating network packets with a first network path indicator, and wherein the second source device encapsulates network packets using UDP encapsulating network packets with a second network path indicator.

5. A method, implemented by a computing device, the method comprising:
   determining to use separate network paths for network traffic from a first source device to a first destination device and network traffic from a second source device to a second destination device within a packet-switched network;
   calculating flow description information to keep the network paths separate, wherein the flow description information indicates use of separate routers or links for at least a portion of the separate network paths, wherein the flow description information specifies a specific type of network flow that is to take separate network paths; and
   sending the flow description information to a group of network devices within the packet-switched network;
   wherein the group of network devices within the packet-switched network use the flow description information for flow-based routing to switch between the separate network paths depending on whether network traffic is addressed from the first source device to the first destination device and is of the specific type of network flow, or from the second source device to the second destination device and is of the specific type of network flow; and
   wherein the group of network devices does not switch between the separate network paths when network traffic is other than the specific type of network flow identified by the flow description information.

6. The method of claim 5, wherein the group of network devices comprise routers that are part of a software defined network.

7. The method of claim 5, wherein the flow description information specifies the specific type of network flow by identifying both a network protocol and a port number.

8. The method of claim 5, wherein the determination to use the separate network paths is an automatic determination based on analysis of the network traffic from the first source device to the first destination device and the network traffic from the second source device to the second destination device being directed to specific services.

9. The method of claim 5, wherein the flow description information does not indicate use of separate network paths for types of network flows other than the specific type.

10. A method, implemented by a network device, the method comprising:
   determining to send a plurality of network flows along different network paths in a computer network, wherein a first network flow of the plurality of network flows is from a first source device to a first destination device, and wherein a second network flow of the plurality of network flows is from a second source device to a second destination device;
   determining separate network paths through the computer network for the first network flow and the second network flow, wherein the separate network paths traverse separate routers or links for at least a portion of the separate network paths, wherein the separate network paths are determined based on a topology of the computer network and hashing information for the computer network, and wherein determining the separate network paths through the computer network comprises:
      using the hashing information to calculate a first hash value corresponding to the first network flow and a second hash value corresponding to the second network flow; and sending path information to the first source device and the second source device, wherein the first and second source devices use the path information to encapsulate network packets that use the separate network paths through the computer network for the first and second network flows, wherein sending the path information comprises:

sending the first hash value to the first source device and the second hash value to the second source device, wherein the first and second source devices use the first and second hash values to calculate first and second network path indicators used to encapsulate network packets so that the first and second network flows use the separate network paths;

wherein routers within the computer network route network packets of the first network flow and the second network flow via the separate network paths to the first and second destination devices.

11. The method of claim 10, wherein the first network path indicator is a first source port that the first source device uses to encapsulate network packets of the first network flow, and wherein the second network path indicator is a second source port that the second source device uses to encapsulate network packets of the second network flow.

12. The method of claim 10, further comprising:

determining separate network paths for one or more additional network flows between one or more additional source devices and one or more additional destination devices; and sending path information to the one or more additional source devices.

13. The method of claim 10, wherein the first source device encapsulates network packets using User Datagram Protocol (UDP) encapsulating network packets with a first network path indicator, and wherein the second source device encapsulates network packets using UDP encapsulating network packets with a second network path indicator.

* * * * *